United States Patent
Boyapati et al.

(10) Patent No.: US 10,567,270 B1
(45) Date of Patent: Feb. 18, 2020

(54) DYNAMIC SIGNALING OF BYPASS TUNNEL BASED ON BANDWIDTH THRESHOLD AT A POINT OF LOCAL REPAIR

(71) Applicant: Juniper Networks, Inc., Sunnyvale, CA (US)

(72) Inventors: Suresh Kumar Boyapati, Sunnyvale, CA (US); Devendra Dilip Kulkarni, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 265 days.

(21) Appl. No.: 15/581,602

(22) Filed: Apr. 28, 2017

(51) Int. Cl.
*H04L 12/721* (2013.01)
*H04L 12/729* (2013.01)
*H04L 12/723* (2013.01)
*H04L 12/733* (2013.01)

(52) U.S. Cl.
CPC .......... *H04L 45/125* (2013.01); *H04L 45/122* (2013.01); *H04L 45/50* (2013.01)

(58) Field of Classification Search
CPC ..... H04L 45/124; H04L 45/125; H04L 45/24; H04L 45/122; H04L 45/50; H04L 47/726
See application file for complete search history.

(56) References Cited

U.S. PATENT DOCUMENTS

| | | | |
|---|---|---|---|
| 2003/0067880 A1* | 4/2003 | Chiruvolu ........... | H04J 14/0227 370/237 |
| 2009/0003200 A1* | 1/2009 | So ......................... | H04L 45/00 370/229 |
| 2011/0188374 A1* | 8/2011 | Zhou ................... | H04L 12/2852 370/231 |
| 2013/0155840 A1* | 6/2013 | Li ......................... | H04L 41/06 370/217 |
| 2017/0078186 A1* | 3/2017 | Thyni ................... | H04L 45/124 |

* cited by examiner

*Primary Examiner* — Kibrom T Hailu
(74) *Attorney, Agent, or Firm* — Harrity & Harrity, LLP

(57) ABSTRACT

A device may receive information that identifies a bandwidth value of a label-switched path (LSP) that includes a protected link or a protected node. The device may determine a bypass LSP bandwidth threshold based on the bandwidth value. The device may determine a set of path bandwidth values associated with a set of paths. The device may compare the set of path bandwidth values and the bypass LSP bandwidth threshold. The device may select a path, of the set of paths, based on comparing the set of path bandwidth values and the bypass LSP bandwidth threshold. The device may generate a bypass LSP using the path.

20 Claims, 12 Drawing Sheets

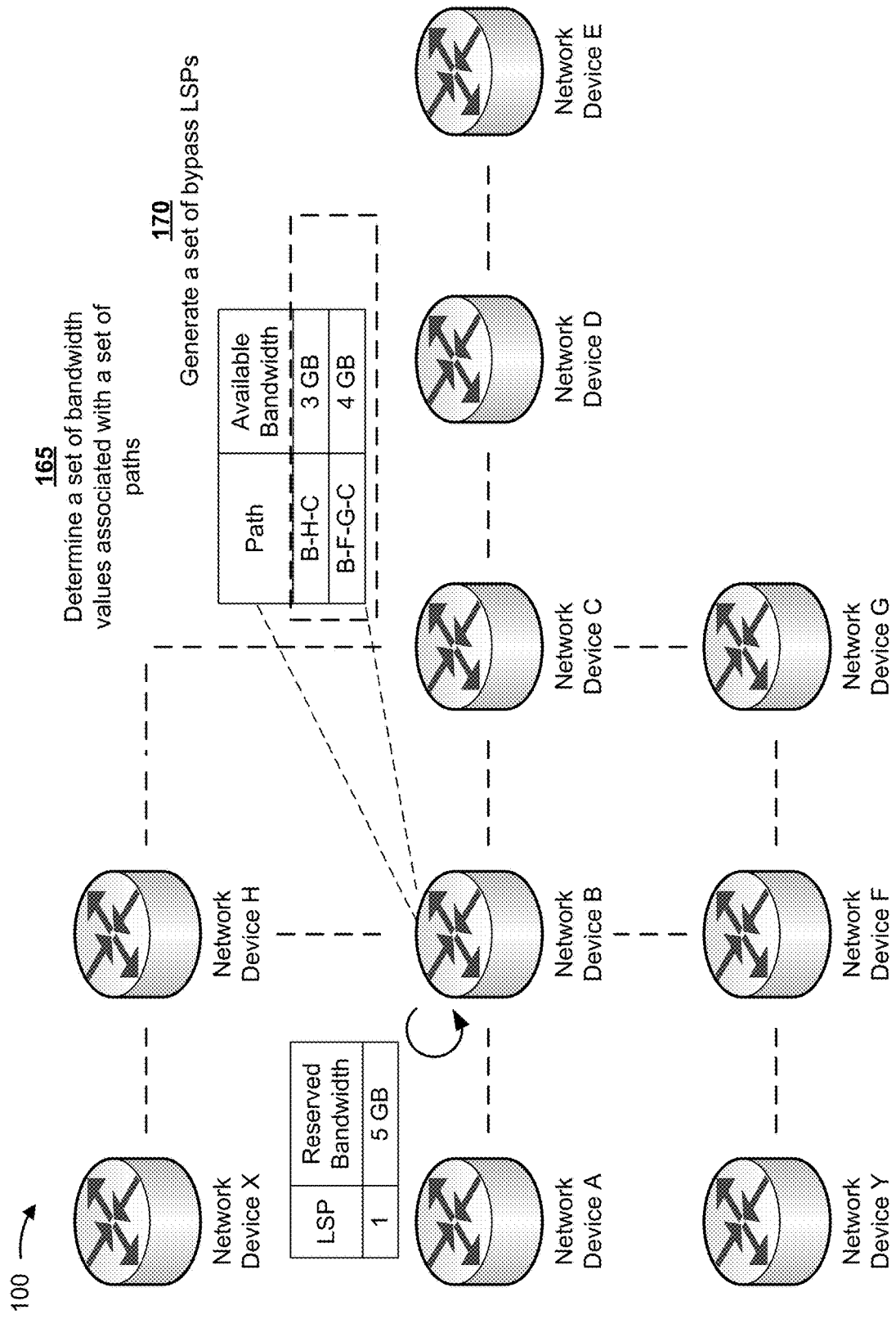

DYNAMIC SIGNALING OF BYPASS TUNNEL BASED ON BANDWIDTH THRESHOLD AT A POINT OF LOCAL REPAIR

BACKGROUND

Label switching is a type of data-carrying technique for high-performance networks that direct data from one network device to the next based on short path labels rather than long network addresses, avoiding complex lookups in a routing table. The labels identify virtual links (paths) between distant devices rather than endpoints.

SUMMARY

In some possible implementations, a device may include one or more processors to receive information that identifies a bandwidth value of a label-switched path (LSP) that includes a protected link or a protected node. The one or more processors may determine a bypass LSP bandwidth threshold based on the bandwidth value. The one or more processors may determine a set of path bandwidth values associated with a set of paths. The one or more processors may compare the set of path bandwidth values and the bypass LSP bandwidth threshold. The one or more processors may select a path, of the set of paths, based on comparing the set of path bandwidth values and the bypass LSP bandwidth threshold. The one or more processors may generate a bypass LSP using the path.

In some possible implementations, a non-transitory computer-readable medium may store one or more instructions that, when executed by one or more processors, cause the one or more processors to receive information that identifies a bandwidth value of a label-switched path (LSP) that includes a protected link or a protected node. The one or more instructions may cause the one or more processors to determine a bypass LSP bandwidth threshold based on the bandwidth value. The one or more instructions may cause the one or more processors to determine a set of path bandwidth values associated with a set of paths. The one or more instructions may cause the one or more processors to compare the set of path bandwidth values and the bypass LSP bandwidth threshold. The one or more instructions may cause the one or more processors to select a path, of the set of paths, based on comparing the set of path bandwidth values and the bypass LSP bandwidth threshold. The one or more instructions may cause the one or more processors to generate a bypass LSP using the path. The one or more instructions may cause the one or more processors to provide network traffic using the bypass LSP.

In some possible implementations, a method may include receiving, by a device, information that identifies a bandwidth value of a label-switched path (LSP) that includes a protected link or a protected node. The method may include determining, by the device, a bypass LSP bandwidth threshold based on the bandwidth value. The method may include determining, by the device, a set of path bandwidth values associated with a set of paths. The method may include comparing, by the device, the set of path bandwidth values and the bypass LSP bandwidth threshold. The method may include selecting, by the device, a path, of the set of paths, based on comparing the set of path bandwidth values and the bypass LSP bandwidth threshold. The method may include generating, by the device, a bypass LSP using the path and without reserving bandwidth of the path.

BRIEF DESCRIPTION OF THE DRAWINGS

FIGS. 1A-1H are diagrams of an overview of an example implementation described herein;

DETAILED DESCRIPTION

Figure 1A:
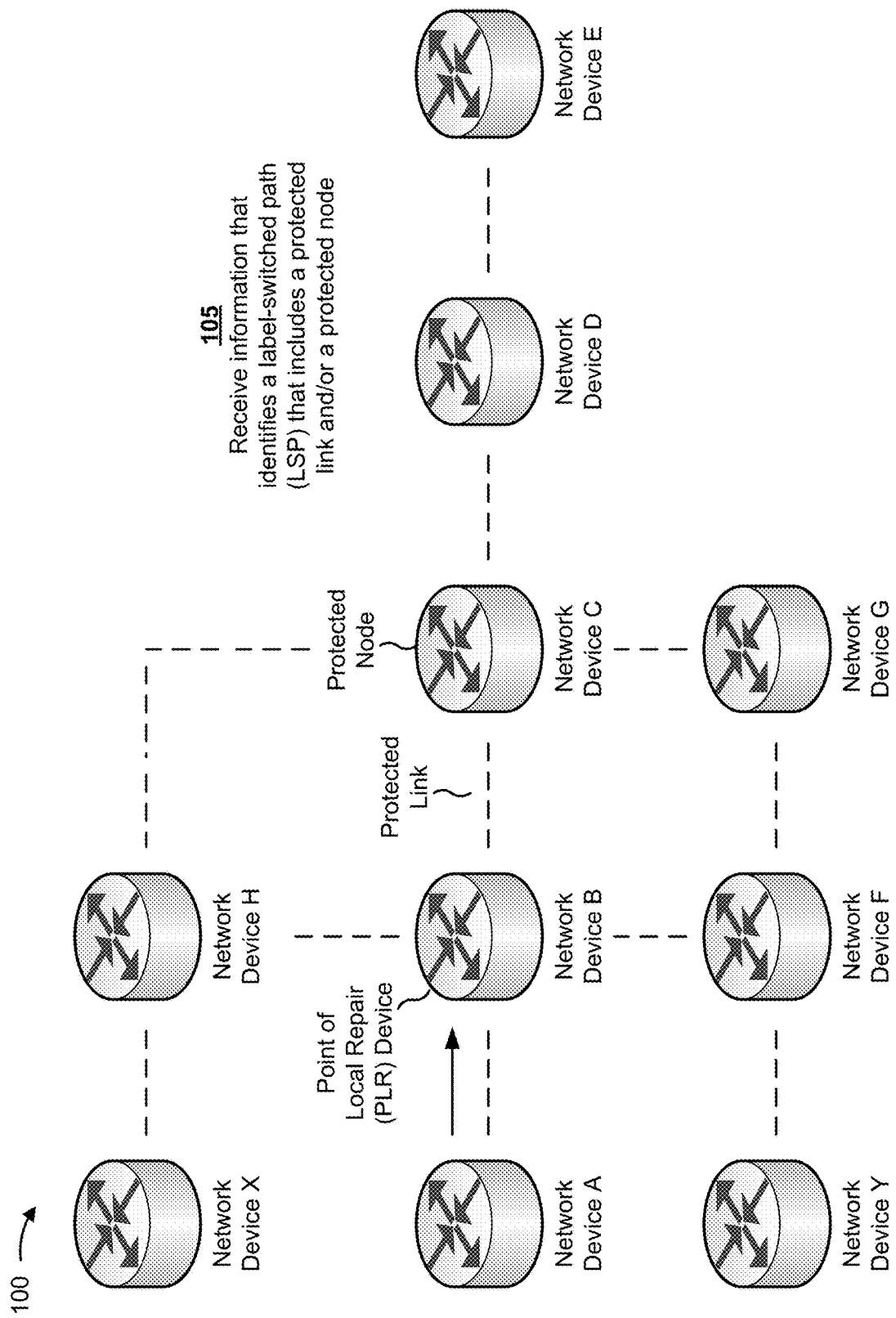

The following detailed description of example implementations refers to the accompanying drawings. The same reference numbers in different drawings may identify the same or similar elements.

A label-switched path (LSP) is a path through a network that is set up by a signaling protocol, such as Label Distribution Protocol (LDP), Resource Reservation Protocol-Traffic Engineering (RSVP-TE), Border Gateway Protocol (BGP), Constraint-based Routing Label Distribution Protocol (CR-LDP), or the like. An LSP may include an ingress network device that operates at an edge of a network, a set of intermediate network devices (e.g., label switch routing (LSR) devices), and an egress network device. The ingress network device may set up the LSP to reach the egress network device, and reserve an amount of bandwidth for the LSP.

In some implementations, a network may implement fast reroute (or local protection) which is a local restoration network resiliency mechanism. Additionally, or alternatively, an LSP may be configured with node protection and/or link protection. For example, link protection may refer to a capability of the LSR devices of an LSP to provide network traffic to an egress network device of the LSP in the event of a failure of a link associated with a set of LSR devices. Additionally, node protection may refer to the capability of the LSR devices of an LSP to provide network traffic to the egress network device of the LSP in the event of a failure of an LSR device of the LSP, a failure of an interface of an LSR device of the LSP, a failure of an interface of a PLR device, or the like.

In some implementations, an LSR device may act as a point of local repair (PLR) device. For example, and in situations where a link (e.g., a logical or physical connection between network devices) associated with the PLR device and a neighboring LSR device fails, the PLR device may route network traffic to the neighboring LSR device using a bypass LSP (i.e., may implement link protection using a next-hop bypass LSP). Additionally, and in situations where the neighboring LSR device is associated with a failure (e.g., a hardware failure, a software failure, or the like), the PLR device may route network traffic to another LSR device using a bypass LSP (i.e., may implement node protection using a next-next-hop bypass LSP). In either case, the PLR device may enable network traffic to reach an egress LSR device despite an underlying link failure or LSR device failure.

In some cases, the PLR device may select a bypass LSP that does not include sufficient available bandwidth to accommodate the re-routed network traffic. For example, assume that an LSP, that is associated with a path that includes a failed link and/or a failed network device, is associated with a total reserved bandwidth of 5 Gigabytes (GB). Additionally, assume that a path (e.g., a potential bypass LSP) includes a reserved bandwidth of 7 GB. In this case, the path may include 3 GB of available bandwidth (e.g., based on a 10 GB capacity of one or more links of the path). Additionally, in this case and in the situation where network traffic associated with the LSP is routed using the path, communication issues (e.g., packet drop, reduced throughput, increased latency, increased jitter, etc.) may occur based on limited bandwidth availability of the path.

In other cases, an ingress network device of an LSP may reserve, for the LSP, bandwidth of a bypass LSP in the absence of a link failure and/or network device failure of the LSP. That is, the ingress network device may reserve bandwidth of a bypass LSP for an LSP such that network traffic of the LSP may utilize the reserved bandwidth in the event of a link failure and/or node failure of the LSP. In this way, bypass LSP bandwidth may be reserved and thereby may reduce communication issues when network traffic, associated with the LSP, is routed using the bypass LSP. However, such bandwidth reservation inefficiently utilizes network resources by preventing resources associated with the bypass LSP from being utilized when the LSP is not associated with a link failure and/or network device failure (i.e., when network traffic associated with the LSP is not being routed using the bypass LSP). For example, bandwidth of the bypass LSP may not be capable of being reserved by other LSPs in such situations.

Further still, in some cases, a PLR device may select a bypass LSP without identifying an available bandwidth of the bypass LSP. For example, assume that a PLR device may route network traffic using either a first path or a second path (e.g., potential bypass LSPs). Additionally, assume that the first path is associated with fewer hops than as compared to the second path, and assume that the first path is associated with less available bandwidth than as compared to the second path. In this case, the PLR device may, using a constrained shortest path first (CSPF) algorithm, select the first path as a bypass LSP for use in providing network traffic associated with the LSP despite limited bandwidth availability of the first path.

Some implementations described herein provide a PLR device to receive information that identifies an LSP that includes a protected link and/or a protected node, and determine a bypass LSP bandwidth threshold based on the information that identifies the LSP. Additionally, some implementations described herein enable the PLR device to determine a set of bandwidth values associated with a set of paths, and select a bypass LSP based on the bypass LSP bandwidth threshold and the set of bandwidth values of the paths. The PLR device may use the bandwidth values of the paths when selecting a bypass LSP, however, the PLR device may refrain from reserving bandwidth of a path when generating the bypass LSP (e.g., signaling the bypass LSP). In this way, implementations described herein effectively signal the bypass LSP by effectively utilizing available and existing resources and without reserving resources.

In this way, some implementations described herein enable the PLR device to select a bypass LSP that includes available bandwidth to support network traffic associated with the LSP, thereby reducing communication issues. Additionally, in this way, some implementations described herein enable the PLR device to select a bypass LSP without previously reserving bandwidth, thereby reducing inefficient resource utilization and conserving network resources. Further still, some implementations described herein enable the PLR device to dynamically route network traffic associated with the LSP using a bypass LSP that is associated with a best available path (e.g., most available bandwidth, least number of hops, or the like). In other words, some implementations described herein enable the PLR device to identify an available bandwidth value of a path, and signal an LSP using the path and without reserving bandwidth of the bypass LSP. In this way, implementations described herein effectively utilize existing resources without reserving resources.

FIGS. 1A-1H are diagrams of an overview of an example implementation 100 described herein. As shown in FIGS. 1A-1H, example implementation 100 may include network devices A, B, C, D, E, F, G, H, X and Y. In this case, assume that network device B is a PLR device, network device C is a protected node, and a link between network device B and network device C is a protected link. Further, assume that network device X, network device A, and network device Y are ingress network devices (e.g., ingress LSR devices), and network device E is an egress network device (e.g., an egress LSR device). While a particular network device (i.e., network device B) is described as a PLR device, it should be understood that other network devices of FIGS. 1A-1H may act as PLR devices.

As shown in FIG. 1A, and by reference number 105, network device B may receive, from network device A (e.g., an ingress LSR device) information that identifies an LSP that includes a protected link and/or a protected node. For example, network device B may identify an LSP (e.g., LSP 1) that includes the link between network device B and network device C, and/or includes network device C.

Figure 1B:
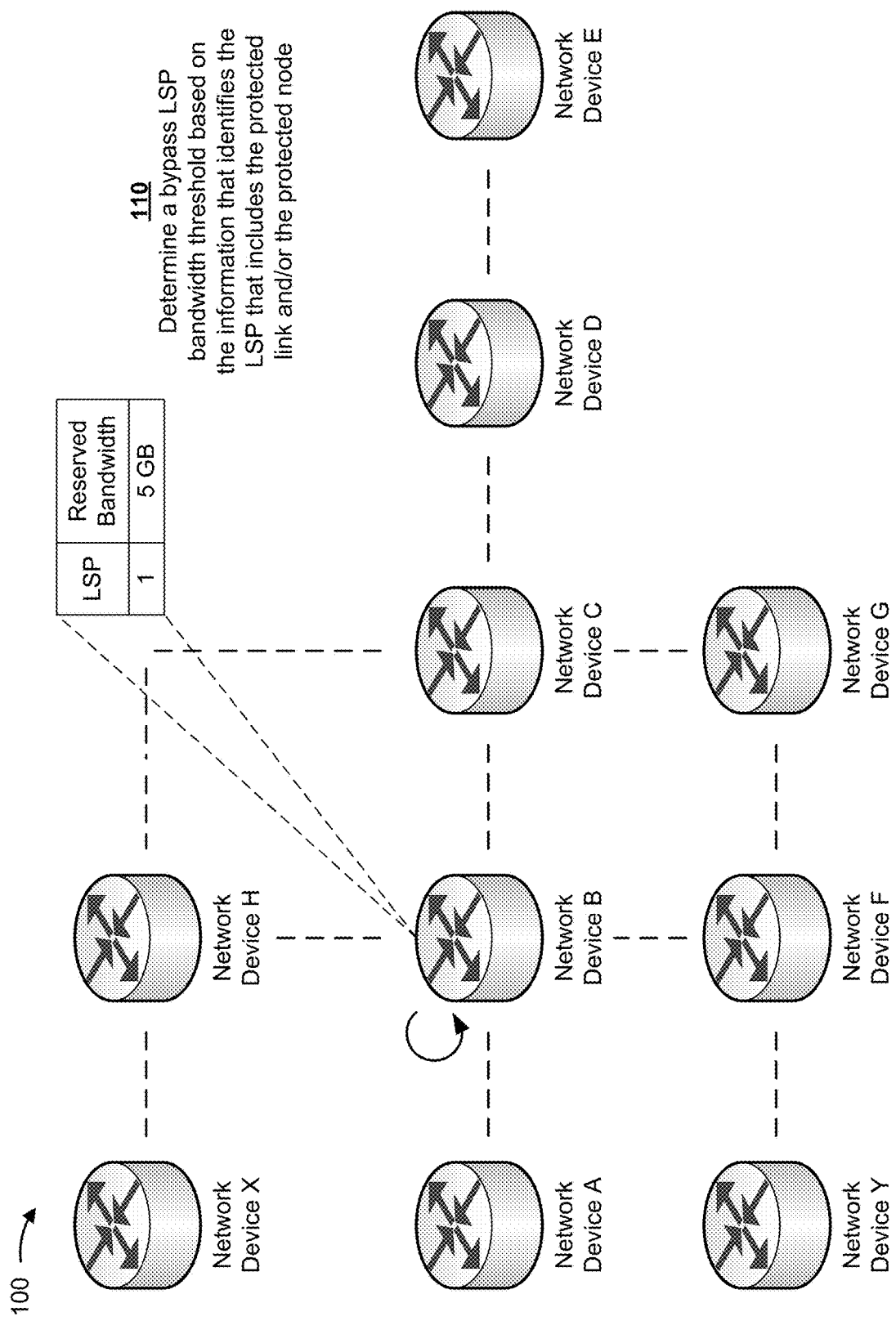

As shown in FIG. 1B, and by reference number 110, network device B may determine a bypass LSP bandwidth threshold based on the information that identifies the LSP that includes the protected link and/or the protected node. For example, network device B may determine that LSP 1 includes a reserved bandwidth value of 5 GB. In this case, network device B may determine a bypass LSP bandwidth threshold of 5 GB. For example, the bypass LSP bandwidth threshold may correspond to an amount of reserved bandwidth of the LSP (e.g., the protected LSP).

FIGS. 1C-1H depict variations of generating (e.g., signaling) a bypass LSP for a set of scenarios, respectively. In other words, FIGS. 1C-1H describe different variations of determining a set of bandwidth values associated with a set of paths, selecting a particular path (or paths), and generating a bypass LSP (or bypass LSPs). Put another way, network device B may generate a bypass LSP using a particular path, and FIGS. 1C-1H depict various outcomes based on different scenarios. It should be understood that network device B may generate a bypass LSP using a particular path without reserving bandwidth of the particular path. That is, network device B may route network traffic using the particular path and without reserving bandwidth of the particular path, thereby effectively utilizing existing resources without reserving resources.

Figure 1C:
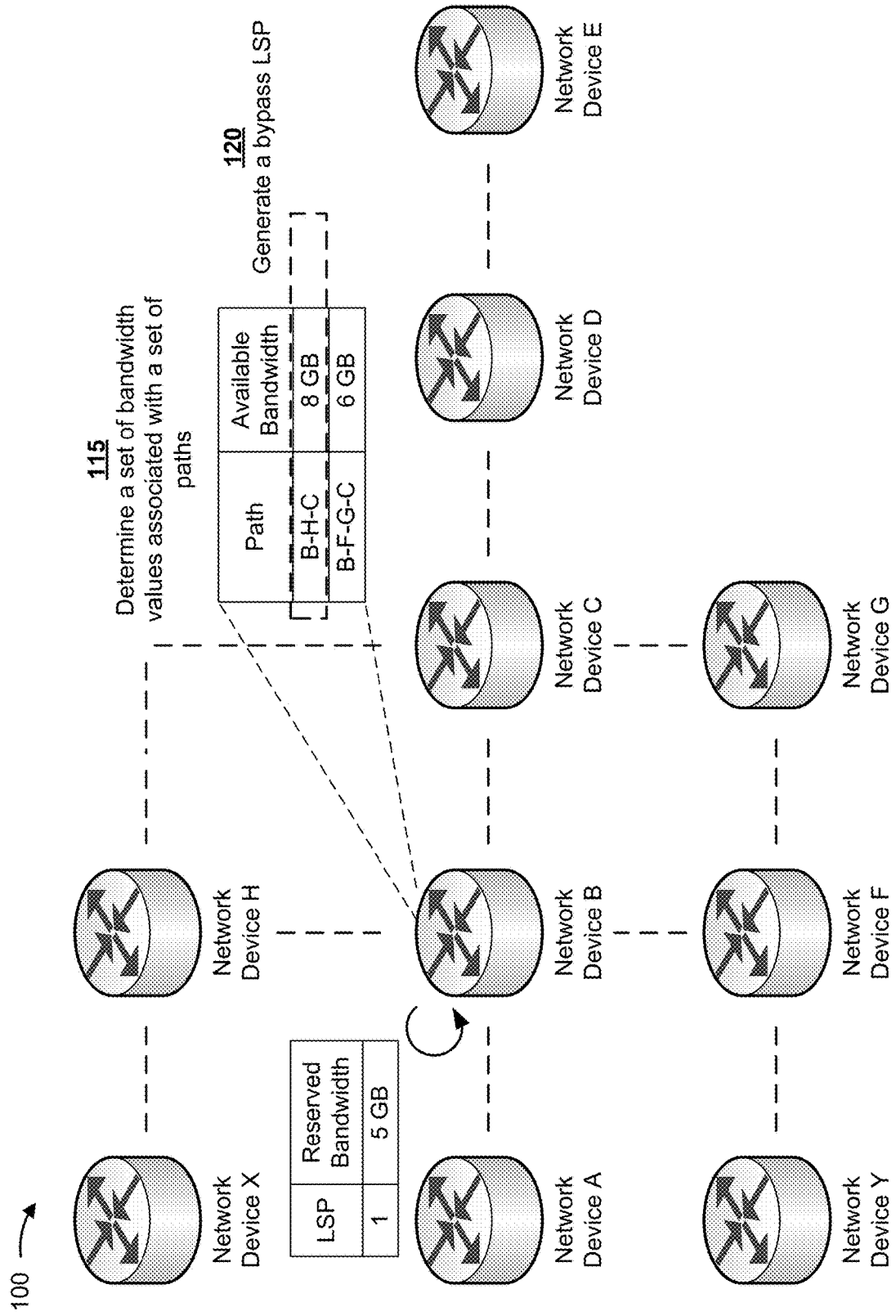

As shown in FIG. 1C, and by reference number 115, network device B may determine an available bandwidth value of 8 GB for a path B-H-C, and an available bandwidth value of 6 GB for another path B-F-G-C. Additionally, network device B may compare the available bandwidth values and the bypass LSP bandwidth threshold of 5 GB. In this case, both paths include available bandwidth values that satisfy the bypass LSP bandwidth threshold (e.g., are greater than 5 GB). However, path B-H-C includes fewer hops than path B-F-G-C. In this case, and as shown by reference number 120, network device B may generate a bypass LSP using the path B-H-C because path B-H-C includes an available bandwidth value that satisfies the bypass LSP bandwidth threshold, and includes fewer hops than path B-F-G-C. Additionally, network device B may generate the bypass LSP without reserving bandwidth of path B-H-C.

Figure 1D:
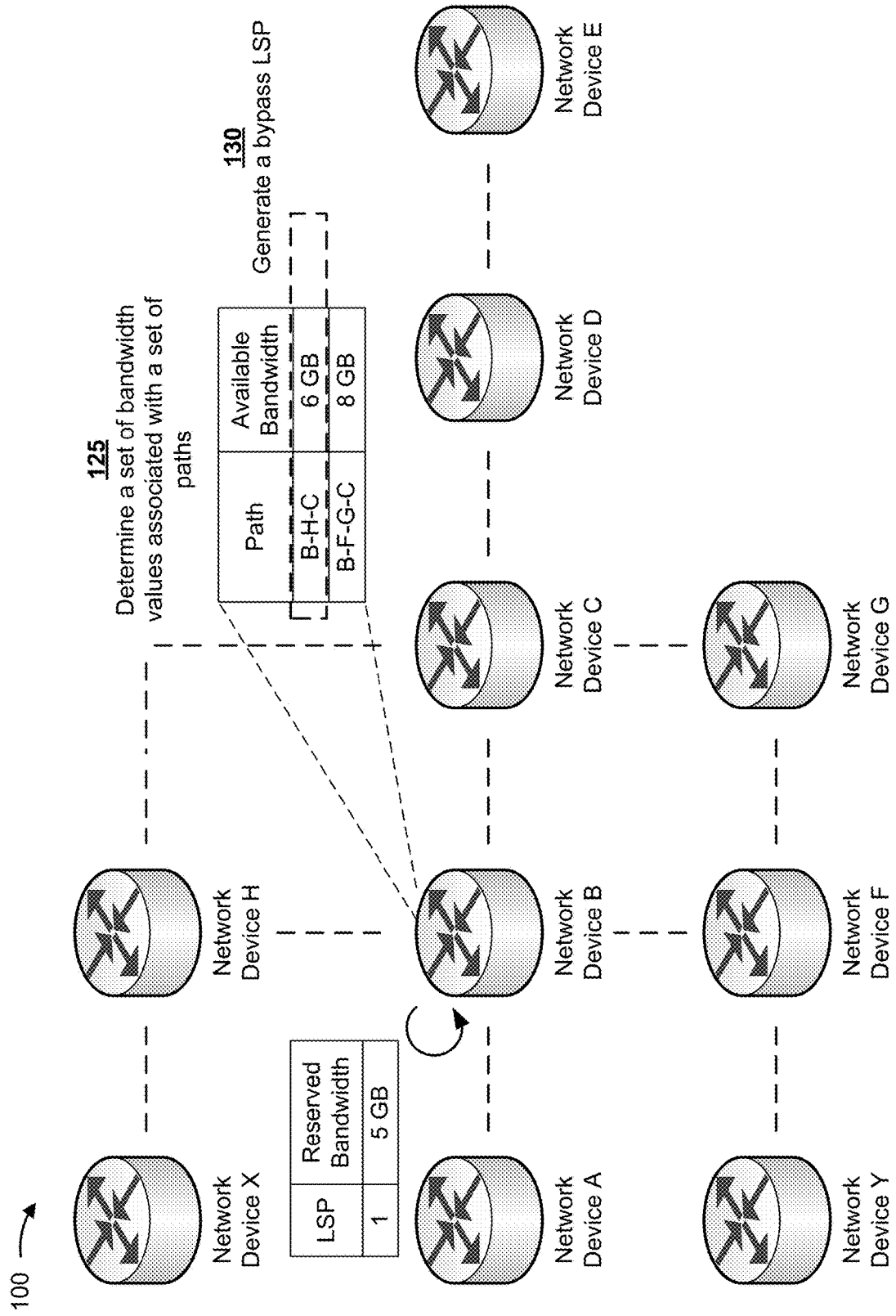

As shown in FIG. 1D, and by reference number 125, network device B may determine an available bandwidth value of 6 GB for path B-H-C, and an available bandwidth value of 8 GB for path B-F-G-C. Additionally, network device B may compare the available bandwidth values and the bypass LSP bandwidth threshold of 5 GB. In this case, both paths include available bandwidth values that satisfy the bandwidth threshold. Additionally, path B-F-G-C includes more available bandwidth than as compared to path B-H-C (e.g., 2 GB more of available bandwidth). However, path B-H-C includes fewer hops than path B-F-G-C. In this case, and as shown by reference number 130, network device B may generate a bypass LSP using the path B-H-C despite path B-F-G-C including more available bandwidth (e.g., because path B-H-C includes fewer hops). Additionally, network device B may generate the bypass LSP without reserving bandwidth of path B-H-C.

Figure 1E:
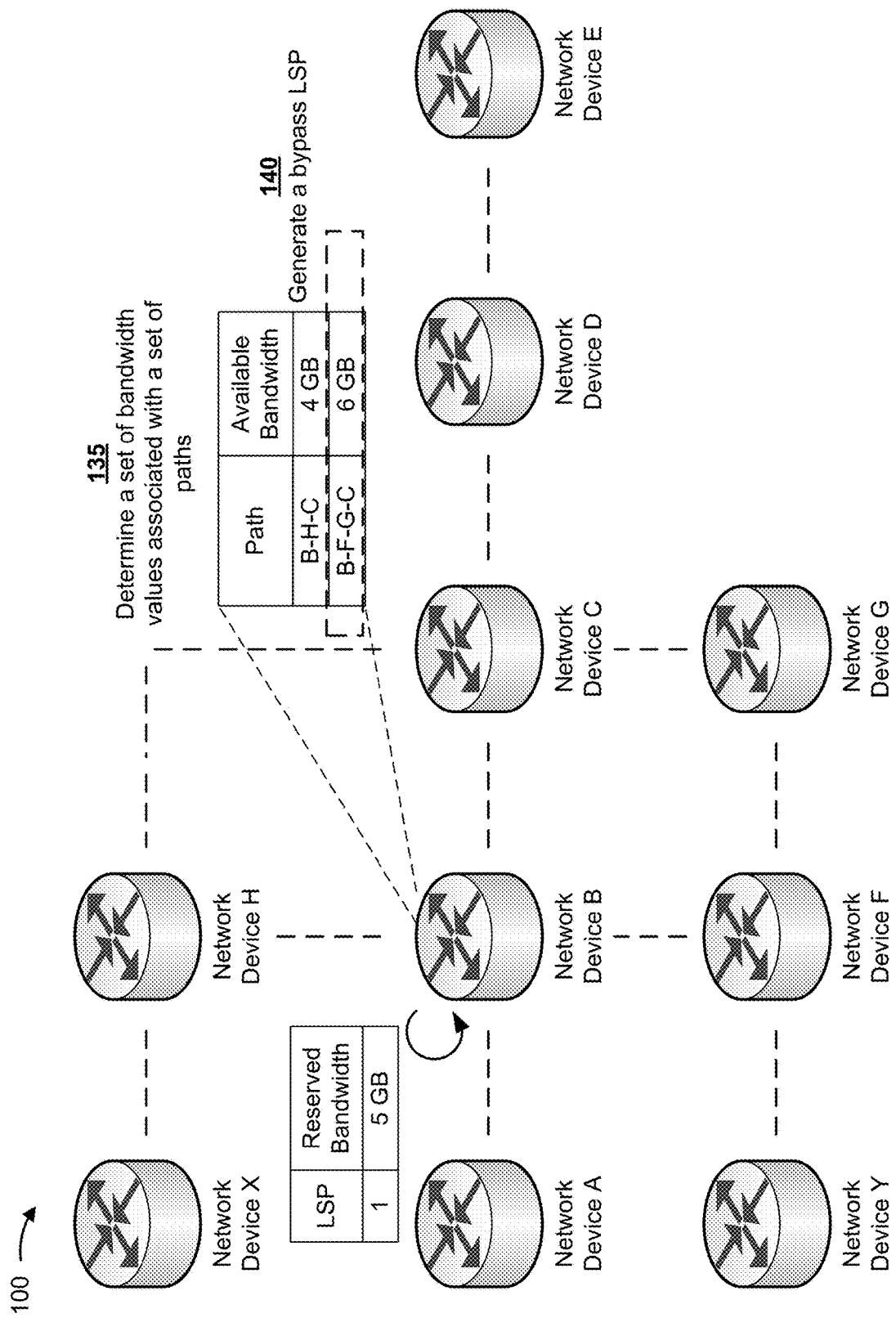

As shown in FIG. 1E, and by reference number 135, network device B may determine an available bandwidth value of 4 GB for path B-H-C, and an available bandwidth value of 6 GB for path B-F-G-C. Additionally, network device B may compare the available bandwidth values and the bypass LSP bandwidth threshold of 5 GB. In this case, path B-H-C does not include an available bandwidth value that satisfies the bypass LSP bandwidth threshold (e.g., 4 GB<5 GB), and path B-F-G-C does include an available bandwidth value that satisfies the bypass LSP bandwidth threshold (e.g., 6 GB>5 GB). In this case, and as shown by reference number 140, network device B may generate a bypass LSP using path B-F-G-C because path B-F-G-C includes an available bandwidth value that satisfies the bypass LSP bandwidth threshold, and because path B-H-C does not include an available bandwidth value that satisfies the bypass LSP bandwidth threshold. Additionally, network device B may generate the bypass LSP without reserving bandwidth of path B-F-G-C.

Figure 1F:
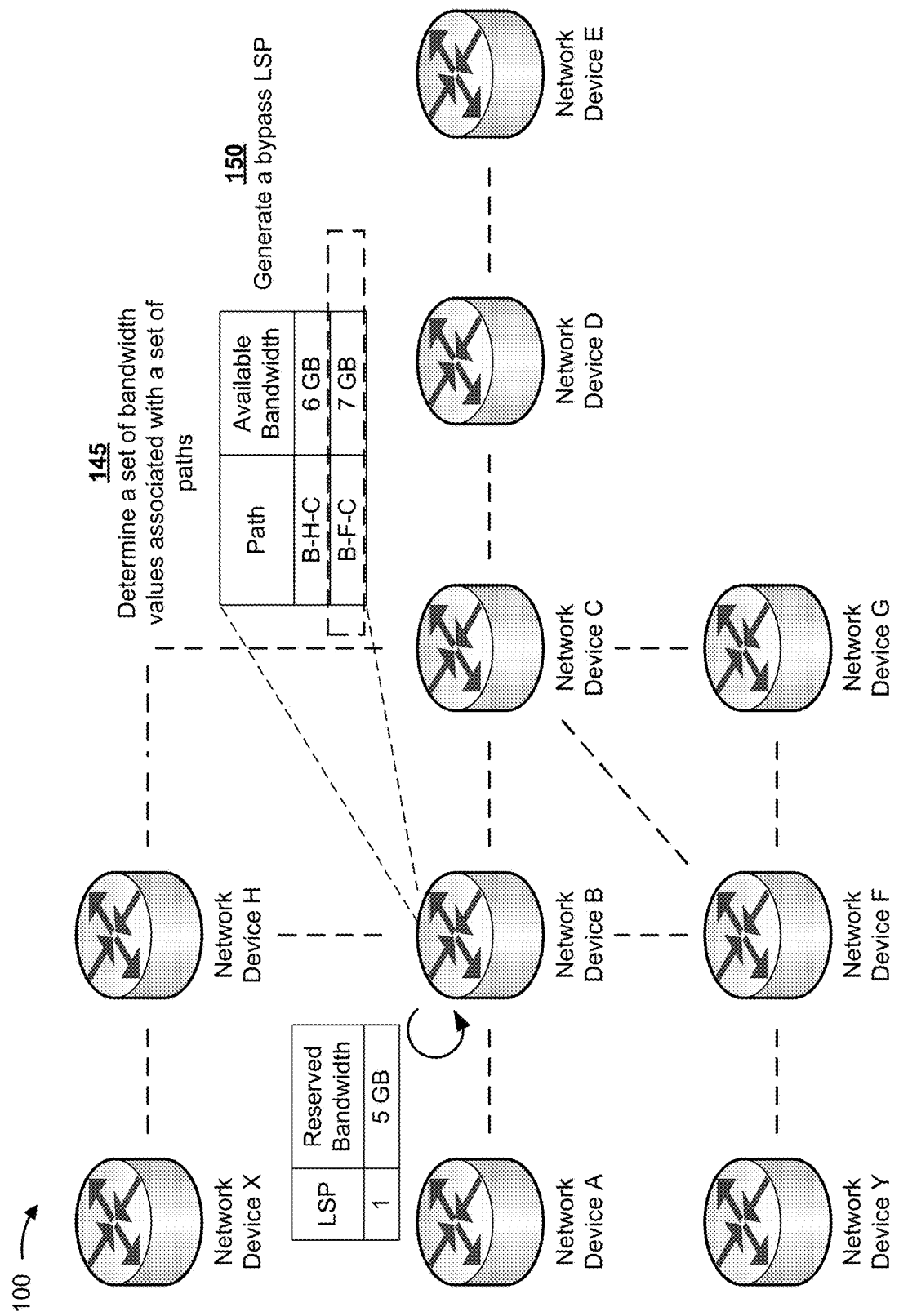

As shown in FIG. 1F, assume that network device F may provide network traffic to network device C via a link. As further shown in FIG. 1F, and by reference number 145, network device B may determine an available bandwidth value of 6 GB for path B-H-C, and an available bandwidth value of 7 GB for path B-F-C. Additionally, network device B may compare the available bandwidth values and the bypass LSP bandwidth threshold of 5 GB. In this case, and as shown by reference number 150, network device B may generate a bypass LSP using path B-F-C because path B-F-C includes more available bandwidth than as compared to path B-H-C. In this way, when multiple paths include the same number of hops, network device B may select the path that includes the most available bandwidth and generate a bypass LSP based on the selected path. Additionally, network device B may generate the bypass LSP without reserving bandwidth of path B-F-C.

Figure 1G:
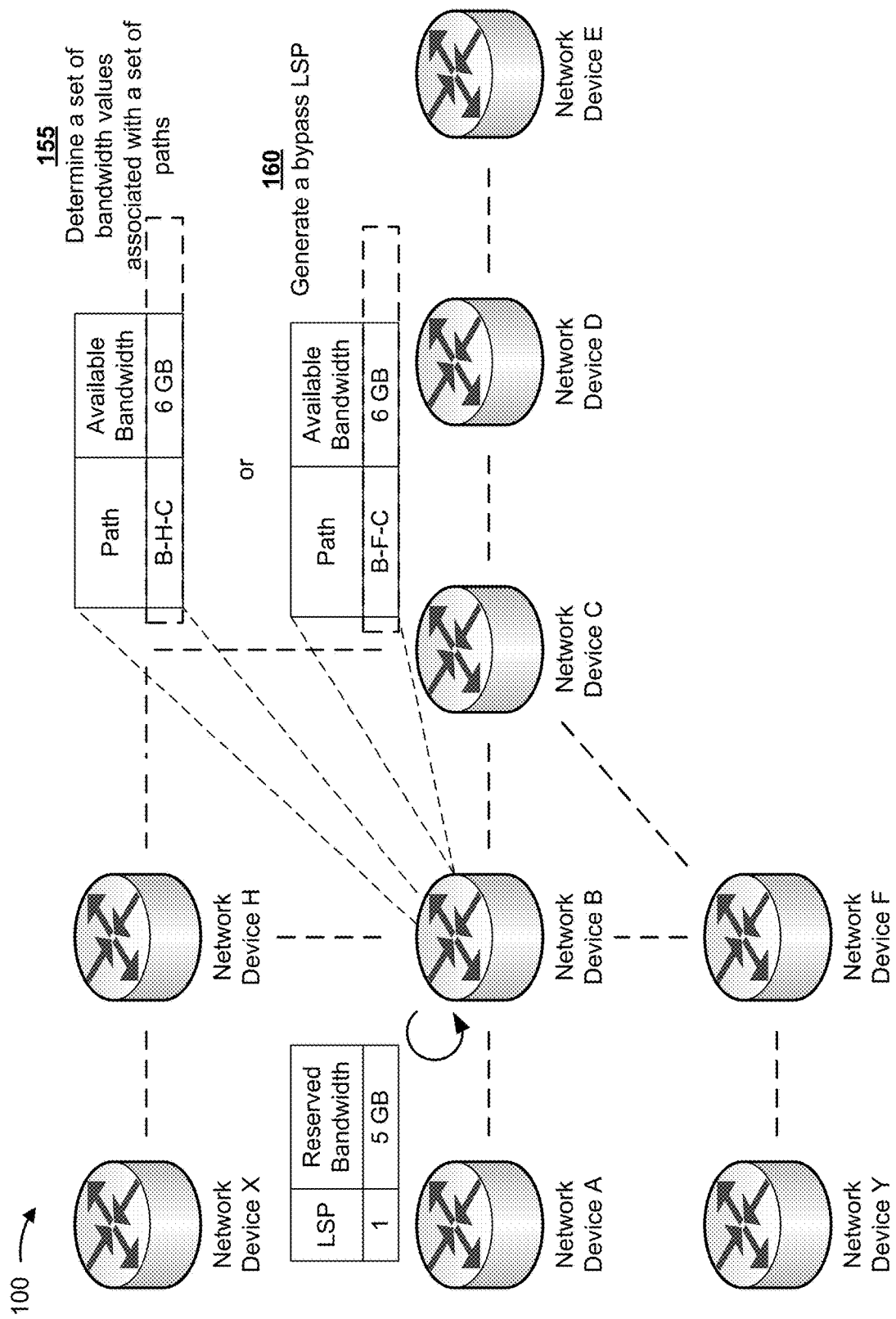

As shown in FIG. 1G, and by reference number 155, network device B may determine an available bandwidth value of 6 GB for path B-H-C, and an available bandwidth value of 6 GB for path B-F-C. Additionally, network device B may compare the available bandwidth values and the bypass LSP bandwidth threshold of 5 GB. In this case, and as shown by reference number 160, network device B may generate a bypass LSP using either path B-H-C or path B-F-C. That is, network device B may select either path to generate the bypass LSP because both paths include a same number of hops and a same available bandwidth. Additionally, both paths include available bandwidth values that satisfy the bypass LSP bandwidth threshold. Additionally, network device B may generate the bypass LSP without reserving bandwidth of the selected path.

As shown in FIG. 1H, and by reference number 165, network device B may determine an available bandwidth value of 3 GB for path B-H-C, and an available bandwidth value of 4 GB for path B-F-G-C. Additionally, network device B may compare the available bandwidth values and the bypass LSP bandwidth threshold of 5 GB. In this case, neither path B-H-C or path B-F-G-C, alone, can satisfy the bypass LSP bandwidth threshold. In this case, and as shown by reference number 170, network device B may generate a set of bypass LSPs using both paths. In some implementations, and in situations where network device B may need to generate multiple bypass LSPs, network device B may minimize a number of bypass LSPs by selecting paths that include the most available bandwidth. Additionally, network device B may generate the bypass LSPs without reserving bandwidth of the paths.

While not shown, network device B may perform similar operations in association with a failure of a protected network device. For example, assume that network device C is associated with a failure (e.g., a hardware failure, a software failure, etc.). In this case, network device B may identify paths that may provide network traffic to network device D and/or network device E. Additionally, network device B may select a particular bypass LSP in a similar manner as described in connection with the protected link.

While implementations herein describe values and/or thresholds associated with a particular network metric (i.e., bandwidth), it should be understood that other implementations include values and/or thresholds that are associated with other network metrics (e.g., latency, throughput, goodput, jitter, number of hops, or the like).

In this way, some implementations described herein reduce communication issues by selecting a bypass LSP that is capable of supporting an amount of bandwidth associated with the LSP that includes the protected link and/or the protected node. Additionally, some implementations described herein improve the efficiency of network resource usage by enabling PLR devices to signal bypass LSPs without having previously reserved bandwidth associated with the bypass LSPs.

As indicated above, FIGS. 1A-1H are provided merely as an example. Other examples are possible and may differ from what was described with regard to FIGS. 1A-1H.

Figure 2:
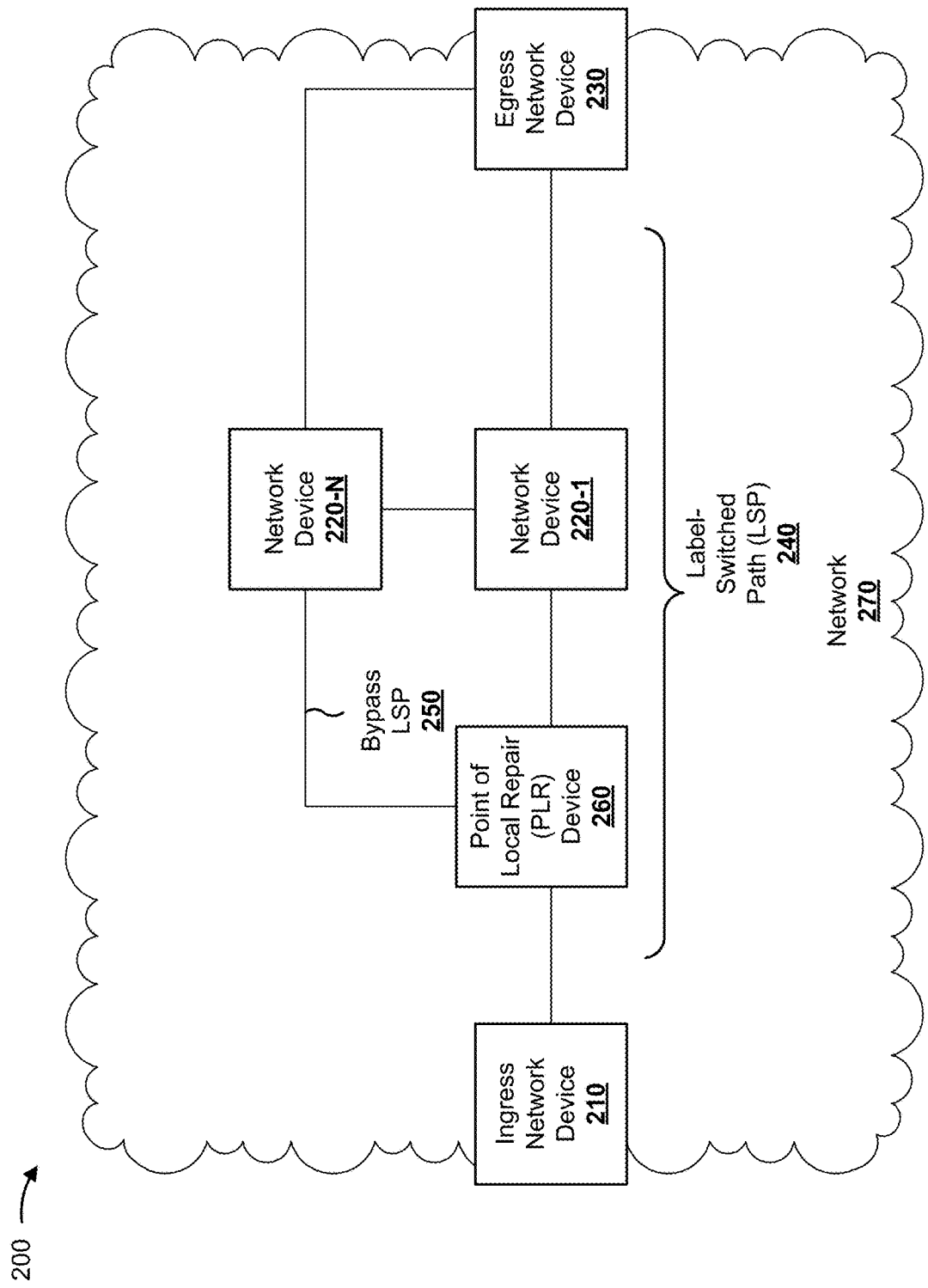
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ingress network device 210, one or more network devices 220-1 through 220-N(N≥1) (hereinafter referred to collectively as "network devices 220," and individually as "network device 220"), an egress network device 230, a set of label-switched paths (LSPs) 240, a set of bypass LSPs 250, a point of local repair (PLR) device 260, and a network 270. Devices of environment 200 may interconnect via wired connections, wireless connections, or a combination of wired and wireless connections.

Ingress network device 210 includes a network device (e.g., a traffic transfer device) capable of processing and transferring network traffic (e.g., packets). For example, ingress network device 210 may include a router (e.g., an ingress label-switched router (LSR)), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, ingress network device 210 may serve as a point of ingress to network 270.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Network device 220 includes a network device capable of processing and transferring network traffic. For example, network device 220 may include a router (e.g., an LSR), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, network device 220 may route packets within network 270.

Egress network device 230 includes a network device capable of processing and transferring network traffic. For example, egress network device 230 may include a router (e.g., an egress LSR), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, egress network device 230 may serve as a point of egress from network 270.

LSP 240 includes a path through network 270 (e.g., used by ingress network device 210, network device 220, egress network device 230, and/or PLR device 260 to carry network traffic). In some implementations, LSP 240 may include a path associated with a flow of network traffic.

Bypass LSP 250 includes a path through network 270 (e.g., used by ingress network device 210, network device 220, egress network device 230, and/or PLR device 260 to carry network traffic). In some implementations, bypass LSP 250 may include a path associated with a flow of network traffic. In some implementations, bypass LSP 250 and LSP 240 may include a set of common network devices 220 (i.e., the same network devices 220). Additionally, or alternatively, bypass LSP 250 and LSP 240 may include a set of different network devices 220. In other words, bypass LSP 250 may include one or more network devices 220 that are not associated with LSP 240, and LSP 240 may include one or more network devices 220 that are not associated with bypass LSP 250.

PLR device 260 includes a device capable of dynamically selecting bypass LSP 250 based on a bandwidth threshold. For example, PLR device 260 may include a network device and/or a computing device. For example, PLR device 260 may include a router (e.g., an LSR), a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, PLR device 260 may be integrated into and a part of one or more other devices shown in environment 200, such as ingress network device 210, network device 220, and/or egress network device 230. In some implementations, a set of network devices 220 may each respectively act as PLR devices 260.

Network 270 includes a network associated with routing and/or forwarding traffic. For example, network 270 may include a multi-protocol label switching (MPLS) based network, an internet protocol (IP) based network, and/or another type of network through which traffic may travel.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
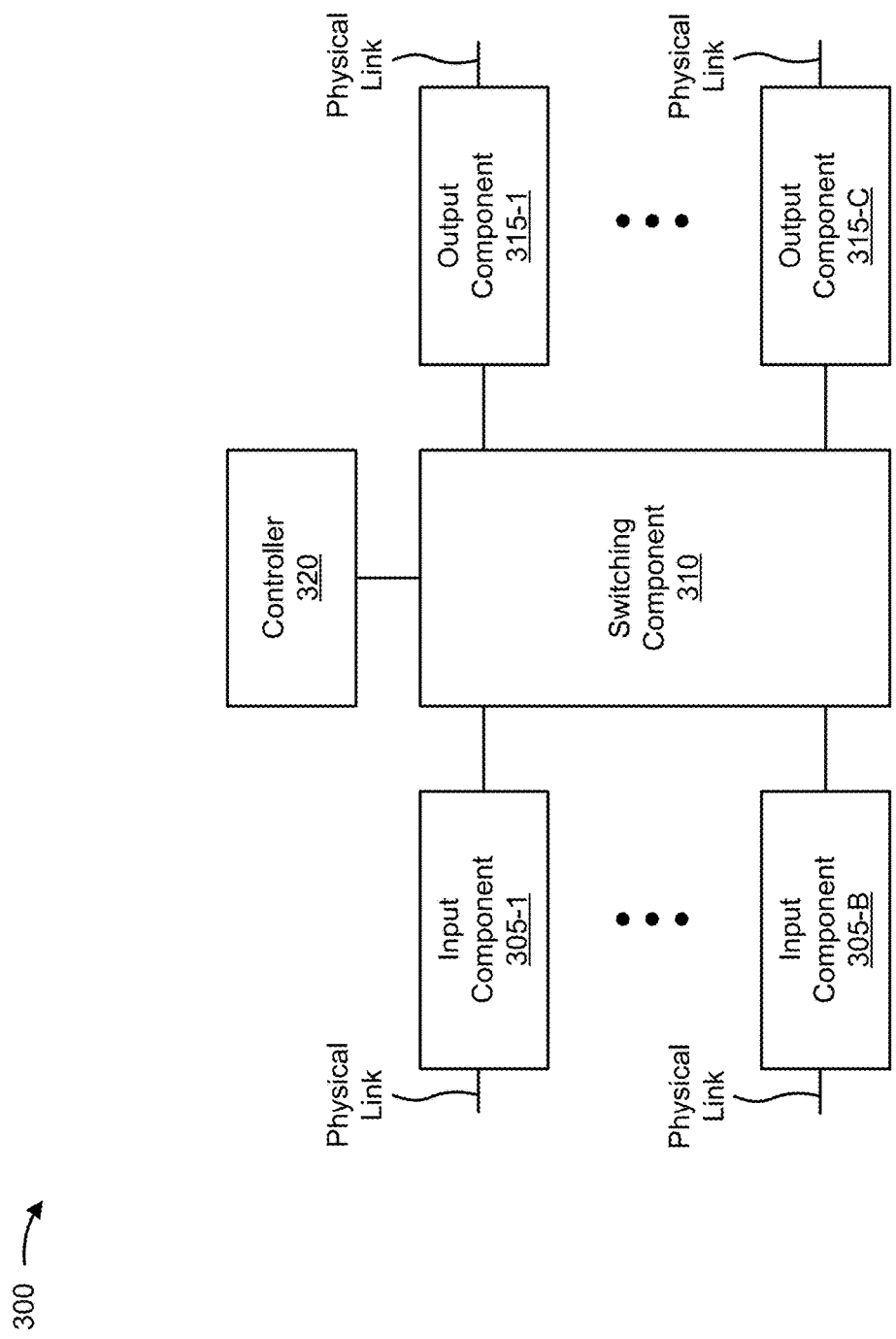
FIG. 3 is a diagram of example components of one or more devices of FIG. 2.

FIG. 3 is a diagram of example components of a device 300. Device 300 may correspond to ingress network device 210, network device 220, egress network device 230, and/or PLR device 260. In some implementations, ingress network device 210, network device 220, egress network device 230, and/or PLR device 260 may include one or more devices 300 and/or one or more components of device 300. In some implementations, device 300 may be implemented as a virtual device that is implemented within a cloud computing environment, such as implemented as a virtual machine that executes on one or more cloud computing devices (e.g., servers) in the cloud computing environment.

As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
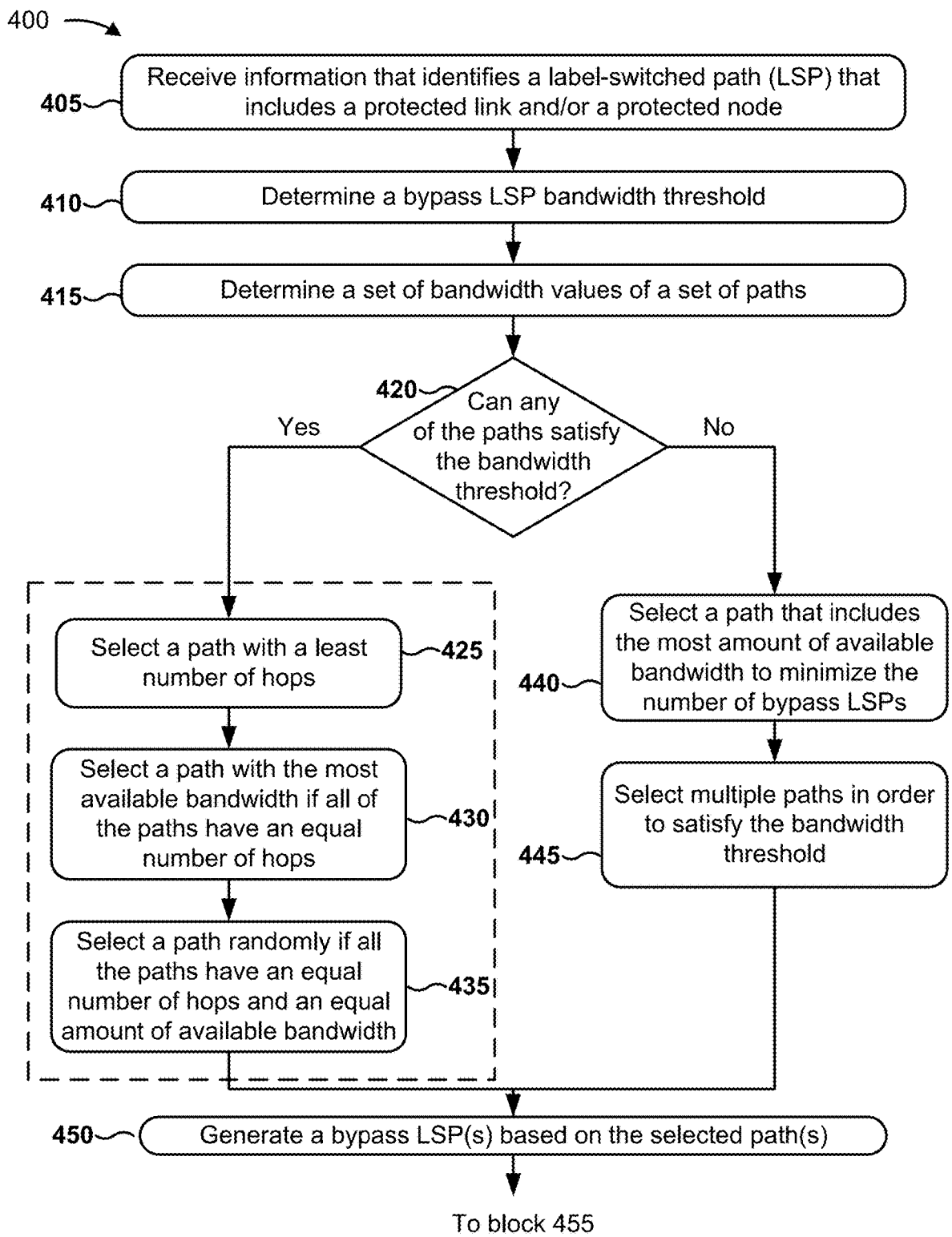
FIGS. 4A and 4B are flow charts of an example process for dynamically selecting a bypass label-switched path based on a bandwidth threshold.
Figure 4B:
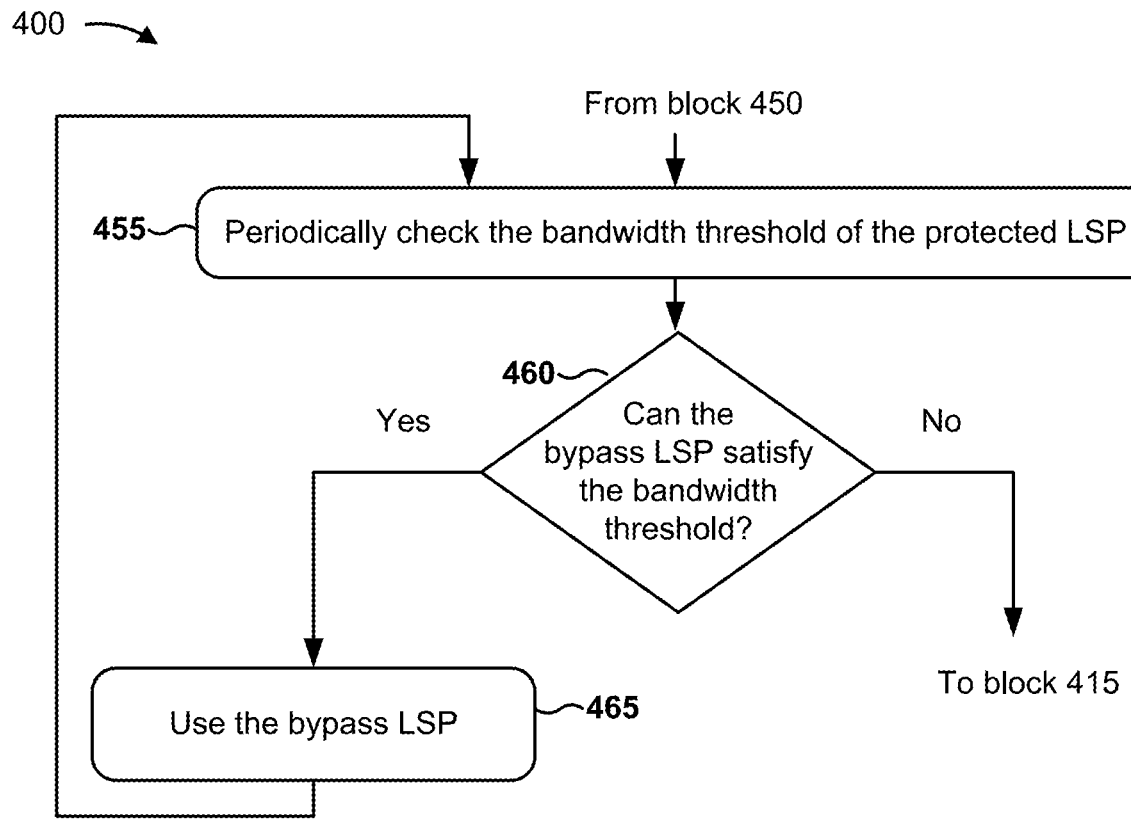

FIGS. 4A and 4B are flow charts of an example process 400 for dynamically selecting a bypass label-switched path based on a bandwidth threshold. In some implementations, one or more process blocks of FIG. 4A and/or FIG. 4B may be performed by PLR device 260. In some implementations, one or more process blocks of FIG. 4A and/or FIG. 4B may be performed by another device or a group of devices separate from or including PLR device 260, such as ingress network device 210, network device 220, and/or egress network device 230.

As shown in FIG. 4A, process 400 may include receiving information that identifies a label-switched path (LSP) that includes a protected link and/or a protected node (block 405). For example, PLR device 260 may receive, from ingress network device 210, information that identifies a set of LSPs 240 and bandwidth values associated with the set of LSPs 240 that include a protected link and/or a protected node.

In some implementations, an LSP 240 may include ingress network device 210, one or more network device(s) 220, PLR device 260, and egress network device 230. In some implementations, PLR device 260 may be associated with multiple LSPs 240. In some implementations, the multiple LSPs 240 may include the same ingress network device 210 and/or the same egress network device 230.

While implementations described herein describe LSP 240 as including a single PLR device 260, it should be understood that LSP 240 may include multiple PLR devices 260. In other words, one or more or all network devices 220 of LSP 240 may respectively act as a PLR device 260, and/or provide link protection and/or node protection for respective neighboring network devices 220 and/or links.

In some implementations, LSP 240 and/or a link associated with PLR device 260 may be configured with link protection. For example, link protection may refer to the capability of PLR device 260 to provide, to a neighboring network device 220, network traffic associated with LSP 240 in the event of a failure of a link between PLR device 260 and the neighboring network device 220. In some implementations, a protected link may refer to a link between PLR device 260 and network device 220 for which PLR device 260 is providing link protection.

In some implementations, LSP 240 and/or PLR device 260 may be configured with node protection. For example, node protection may refer to the capability of PLR device 260 to provide, to egress network device 230 via one or more network devices 220, network traffic associated with LSP 240 in the event of a failure of a neighboring network device 220. In some implementations, a protected node may refer to a network device 220 for which PLR device 260 is providing node protection.

In some implementations, PLR device 260 may receive, from ingress network device 210, the information that identifies the set of LSPs 240 that include the protected link and/or the protected node (e.g., LSP information). For example, ingress network device 210 may provide, to PLR device 260, signaling messages that include link protection-node protection (LP-NP) flags that identify LSPs 240 that include protected links and/or protected nodes.

In some implementations, the LSP information may include a set of identifiers of respective LSPs 240. Additionally, or alternatively, the LSP information may identify respective bandwidth values associated with the respective LSPs 240. As used herein, a bandwidth value associated with an LSP 240 may refer to a reserved bandwidth value for the LSP 240, an available bandwidth value for the LSP 240, a bandwidth usage value for the LSP 240, or the like. For example, and in reference to a particular LSP 240, the LSP information may include an amount of reserved bandwidth for LSP 240 (e.g., reserved by ingress network device 210 using RSVP-TE signaling). Alternatively, the LSP information may include an amount of available bandwidth. Alternatively, the LSP information may include a bandwidth usage value associated with LSP 240. For example, ingress network device 210 and/or PLR device 260 may sample network traffic (e.g., based on a sampling interval, such as every 5 minutes, 10 minutes, 30 minutes, etc.), and may determine a bandwidth usage value associated with a particular LSP 240 (e.g., a sampled bandwidth usage value).

As further shown in FIG. 4A, process 400 may include determining a bypass LSP bandwidth threshold (block 410). For example, PLR device 260 may determine a bypass LSP bandwidth threshold based on respective bandwidth values associated with LSPs 240.

In some implementations, the bypass LSP bandwidth threshold may refer to a bandwidth value that may be used to select a bypass LSP 250, as described elsewhere herein. In some implementations, PLR device 260 may determine the bypass LSP bandwidth threshold based on the LSP information. For example, PLR device 260 may perform an operation using the bandwidth values associated with LSPs 240, and determine the bypass LSP bandwidth threshold based on the operation.

In some implementations, and as described elsewhere herein, PLR device 260 may determine a bypass LSP bandwidth threshold such that PLR device 260 may compare the bypass LSP bandwidth threshold and available bandwidth values of paths. In this way, PLR device 260 may select a particular path to signal bypass LSP 250. However, PLR device 260 may not (e.g., refrain) reserve bandwidth of the particular path (e.g., signal bypass LSP 250 without reserving bandwidth).

In other words, PLR device 260 may use the reserved bandwidth of LSP 240 to determine the bypass LSP bandwidth threshold, such that PLR device 260 may identify an amount of bandwidth that bypass LSP 250 should support. However, PLR device 260 may refrain from reserving bandwidth of a path associated with bypass LSP 250. That is, PLR device 260 may route network traffic using bypass LSP 250, and may refrain from reserving bandwidth of the path associated with bypass LSP 250. In this way, PLR device 260 effectively utilizes existing resources without reserving resources.

In some implementations, the bypass LSP bandwidth threshold may refer to a minimum amount of available bandwidth that a path should include in order to be selected by PLR device 260 as a bypass LSP 250. For example, a path that includes a bandwidth value (e.g., an available bandwidth value) that is less than the bypass LSP bandwidth threshold may not be selected to route network traffic associated with LSP 240, whereas a path that includes a bandwidth value that is greater than the bypass LSP bandwidth threshold may be selected to route network traffic associated with LSP 240 in the event of a failure of a protected link and/or a protected node.

In some implementations, PLR device 260 may determine the bypass LSP bandwidth threshold based on bandwidth values associated with LSPs 240 for which link protection and/or node protected is enabled. For example, PLR device 260 may determine the bypass LSP bandwidth threshold based on a total reserved bandwidth value of the LSPs 240 (e.g., may aggregate respective amounts of reserved bandwidth to determine a total reserved bandwidth value). That is, in situations where PLR device 260 identifies a single bypass LSP 250 to route network traffic associated with multiple LSPs 240, then PLR device 260 may determine the bypass LSP bandwidth threshold based on aggregating bandwidth values associated with the multiple LSPs 240.

In some implementations, PLR device 260 may determine a set of bypass LSP bandwidth thresholds. For example, PLR device 260 may determine a bypass LSP bandwidth threshold for each LSP 240, for a set of LSPs 240, or the like, for which PLR device 260 is providing link protection and/or node protection.

As a particular example, assume that PLR device 260 is providing link protection and/or node protection for three LSPs 240 that include reserved bandwidth values of 1 GB, 2 GB, and 3 GB respectively. In this case, PLR device 260 may determine a bypass LSP bandwidth threshold of 6 GB (e.g., 1 GB+2 GB+3 GB=6 GB). Additionally, or alternatively, PLR device 260 may determine three bypass LSP bandwidth thresholds of 1 GB, 2 GB, and 3 GB, respectively. In other words, and as described elsewhere herein, PLR device 260 may identify and generate a single bypass LSP 250 that is capable of providing network traffic at a minimum rate of 6 GB per second (e.g., to accommodate network traffic of all of the LSPs 240), or may identify and select multiple bypass LSPs 250 that are capable of, collectively, providing network traffic at a minimum rate of 6 GB per second.

As described elsewhere herein, PLR device 260 may use the bypass LSP bandwidth threshold or thresholds to select and generate a particular bypass LSP 250 in the event of a failure of a protected link and/or a protected node. In this way, and continuing the above example, PLR device 260 may identify a path that is capable of providing network traffic at a rate of 6 GB per second or greater. Alternatively, and continuing the example, PLR device 260 may identify multiple paths that are capable of providing network traffic at a rate that, at a minimum, is greater than 1 GB per second. For example, assume that a first path is capable of providing network traffic at a rate of 4 GB per second. In this case, PLR device 260 may route network traffic associated with the LSP 240 that includes the reserved bandwidth value of 1 GB and network traffic associated with the LSP 240 that includes the reserved bandwidth value of 2 GB using the first path. Additionally, PLR device 260 may route network traffic associated with the LSP 240 that includes the reserved bandwidth value of 3 GB using a second path that is capable of providing the network traffic at a minimum rate of 3 GB per second. In this way, network traffic associated with the three LSPs 240 may be routed using bypass LSPs 250 that are capable of providing the network traffic at a rate that is greater than respective reserved bandwidth values of the three LSPs 240.

In some implementations, a reserved bandwidth value may identify an amount (e.g., a minimum) of bandwidth that is to be supported by ingress network device 210, network device(s) 220, egress network device 230, and/or links of LSP 240. As an example, in situations where an LSP 240 is configured with 3 GB of reserved bandwidth, then ingress network device 210, network device(s) 220, and/or egress network device 230 of LSP 240 may allocate resources towards providing network traffic associated with the LSP 240 at a minimum of 3 GB per second.

In this way, and as an example, bandwidth may be reserved for flows that are sensitive to packet drop and/or increased latency. By using reserved bandwidth values associated with respective LSPs 240 that are configured with link protection and/or node protection, PLR device 260 may determine a bandwidth threshold (e.g., a minimum bandwidth) for a bypass LSP 250 that is greater than or equal to the amount of bandwidth that was reserved for the original LSPs 240.

In some implementations, PLR device 260 may determine a set of bandwidth values associated with a set of paths (e.g., potential bypass LSPs 250), and select a bypass LSP 250 based on a respective bandwidth value and the bypass LSP bandwidth threshold, as described elsewhere herein. In this way, PLR device 260 may select a particular bypass LSP 250 that is capable (or more capable than as compared to another bypass LSP 250) of supporting reserved bandwidth values associated with LSPs 240. In other words, PLR device 260 may select a bypass LSP 250 that is capable of providing network traffic at a rate that is greater than or equal to a reserved bandwidth value of LSP 240.

As further shown in FIG. 4A, process 400 may include determining a set of bandwidth values of a set of paths (block 415). For example, PLR device 260 may determine a set of bandwidth values associated with a set of paths to identify a particular path that is capable of providing network traffic at a rate that is greater than the bypass LSP bandwidth threshold. As used herein, a bandwidth value associated with a path may refer to a reserved bandwidth value for the path, an available bandwidth value for the path, a bandwidth usage value for the path, a link capacity associated with the path, or the like. Additionally, as used herein, a path bandwidth value may refer to a bandwidth value of a path.

In some implementations, PLR device 260 may receive, from one or more devices of network 270, topology information associated with network 270. For example, PLR device 260 may receive topology information from network devices 220, ingress network device 210, and/or egress network device 230. As an example, PLR device 260 may receive the topology information via link-state routing protocol signaling (e.g., open shortest path first (OSPF-TE) signaling, intermediate system to intermediate system (IS-IS) signaling, or the like).

In some implementations, the topology information may include information that identifies a topology of network 270 (e.g., a topology of network devices 220, links between network devices 220, interfaces of network devices 220, or the like) and bandwidth reservations associated with LSPs 240 associated with network 270. In some implementations, PLR device 260 may store, in a data structure (e.g., a traffic engineering database (TED), a table, or the like), the topology information, and/or may access the topology information.

In some implementations, PLR device 260 may identify a set of paths based on the topology information. For example, in a situation where PLR device 260 is providing link protection for a neighboring network device 220, PLR device 260 may identify a set of paths to the neighboring network device 220. Additionally, or alternatively, in a situation where PLR device 260 is providing node protection for the neighboring network device 220, PLR device 260 may identify a set of paths to egress network device 230 (e.g., via one or more other network devices 220).

In some implementations, PLR device 260 may identify bandwidth values of the identified paths based on the topology information. For example, the bandwidth values may include an amount of reserved bandwidth for the respective paths, may include an amount of available bandwidth, may include an amount of sampled bandwidth, or the like. In this way, PLR device 260 may select a particular path to route network traffic in the event of a failure of a protected link and/or protected node, as described elsewhere herein.

In some implementations, PLR device 260 may identify bandwidth values associated with particular network devices 220 and/or links associated with the set of paths. For example, a particular path may include multiple network devices 220 and/or links between network devices 220. Additionally, each network device 220 and/or link may be capable of providing network traffic at a different rate than as compared to other network devices 220 and/or links of the path. In this case, PLR device 260 may identify the respective bandwidth values of respective network devices 220 and/or links, and select a path based on the respective bandwidth values.

As an example, assume that a path includes a first network device 220, a second network device 220, and a third network device 220. Additionally, assume that the path includes a first link between the first network device 220 and the second network device 220, and a second link between the second network device 220 and the third network device 220. Further, assume that the first link includes an available bandwidth value of 1 GB, and that the second link includes an available bandwidth value of 4 GB. In this case, PLR device 260 may determine a bandwidth value of 1 GB for the path based on the 1 GB of available bandwidth of the first link. For example, in situations where PLR device 260 uses the greater bandwidth value (i.e., 4 GB) when determining the bandwidth value of the path, PLR device 260 may inaccurately determine an amount of available bandwidth (e.g., because the first link may be capable of supporting a bit rate of 1 GB per second).

In this way, PLR device 260 may determine bandwidth values for a set of paths, and select a particular path (or paths) to generate a bypass LSP 250, as described below.

As further shown in FIG. 4A, process 400 may include determining whether any of the paths can satisfy the bypass LSP bandwidth threshold (block 420). For example, PLR device 260 may compare bandwidth values of the paths and the bypass LSP bandwidth threshold, and determine if any of the paths can satisfy the bypass LSP bandwidth threshold. In other words, PLR device 260 may determine if a path, of the set of paths, includes a respective bandwidth value that is greater than the bypass LSP bandwidth threshold.

As further shown in FIG. 4A, if one or more paths include bandwidth values that satisfy the bypass LSP bandwidth threshold (block 420—YES), then process 400 may include selecting a path with a least number of hops (block 425). For example, if one or more paths include bandwidth values that can satisfy the bypass LSP bandwidth threshold, then PLR device 260 may select a path, of the one or more paths, that includes the least number of hops (e.g., a minimum number of hops). For example, PLR device 260 may compare numbers of hops of the paths, and select the path that includes the least number of hops.

As further shown in FIG. 4A, process 400 may include selecting a path with the most available bandwidth if all of the paths have an equal number of hops (block 430). For example, if all of the paths, that include bandwidth values that satisfy the bypass LSP bandwidth threshold, include a same number of hops, then PLR device 260 may select the particular path that includes the most available bandwidth.

As further shown in FIG. 4A, process 400 may include selecting a path randomly if all the paths have an equal number of hops and an equal amount of available bandwidth (block 435). For example, if all of the paths, that include bandwidth values that satisfy the bypass LSP bandwidth threshold include a same number of hops and a same amount of available bandwidth, then PLR device 260 may randomly select a path (i.e., may select any of the paths).

As further shown in FIG. 4A, if none of the paths include available bandwidth values that can satisfy the bypass LSP bandwidth threshold (block 420—NO), then process 400 may include selecting a path that includes the most available bandwidth to minimize the number of bypass LSPs (block 440). For example, if none of the paths include bandwidth values that satisfy the bypass LSP bandwidth threshold, then PLR device 260 may select multiple paths in order to generate a set of bypass LSPs 250.

In some implementations, PLR device 260 may select a path that includes the most available bandwidth, and generate a bypass LSP 250 based on the path, as described elsewhere herein. Additionally, PLR device 260 may select other paths to generate additional bypass LSPs 250, as described below.

As further shown in FIG. 4A, process 400 may include selecting multiple paths in order to satisfy the bandwidth threshold (block 445). For example, PLR device 260 may iteratively perform operations associated with block 440 until PLR device 260 selects enough paths to generate a set of bypass LSPs 250 that may accommodate an amount of traffic associated with the bypass LSP bandwidth threshold. Additionally, PLR device 260 may select the multiple paths such that a number of paths (and bypass LSPs 250) is minimized. That is, by selecting paths that include the most available bandwidth, PLR device 260 may minimize the number of paths that are used to generate the set of bypass LSPs 250.

As further shown in FIG. 4A, process 400 may include generating a bypass LSP(s) based on the selected path(s) (block 450). For example, PLR device 260 may generate bypass LSP(s) 250 based on a selected path (or paths). In some implementations, PLR device 260 may signal bypass LSP 250, and route network traffic using bypass LSP 250.

In some implementations, bypass LSP 250 may include a next-hop bypass LSP 250. That is, a next-hop bypass LSP 250 may provide an alternative path to reach a neighboring network device 220 of PLR device 260. Alternatively, bypass LSP 250 may include a next-next-hop bypass LSP 250. That is, a next-next-hop bypass LSP 250 may include an alternative path for LSP 240 to reach egress network device 230 while bypassing a neighboring network device 220 (e.g., a failed network device 220). In this way, PLR device 260 may route network traffic using a path associated with bypass LSP 250.

As shown in FIG. 4B, process 400 may include periodically checking the bandwidth threshold of the protected LSP (block 455). For example, PLR device 260 may periodically (e.g., based on a time frame, an interval, or the like) determine whether bypass LSP 250 includes an amount of available bandwidth to support network traffic associated with LSP 240 (e.g., if the available bandwidth of bypass LSP 250 satisfies the bypass LSP threshold).

As further shown in FIG. 4B, process 400 may include determining whether the bypass LSP includes an amount of available bandwidth to satisfy the bypass LSP bandwidth threshold (block 460). For example, PLR device 260 may determine whether bypass LSP 250 includes an amount of available bandwidth to support network traffic associated with LSP 240.

That is, PLR device 260 may compare an available bandwidth value of bypass LSP 250 and the bypass LSP bandwidth threshold, and determine whether the available bandwidth value is greater than the bypass LSP bandwidth threshold.

As further shown in FIG. 4B, if the bypass LSP does include an amount of available bandwidth to satisfy the bypass LSP bandwidth threshold (block 460—YES), then process 400 may include using the bypass LSP (block 465). For example, if bypass LSP 250 includes an amount of available bandwidth, such that bypass LSP 250 may support network traffic associated with LSP 240, then PLR device 260 may continue to use bypass LSP 250 to route network traffic associated with LSP 240. In this way, PLR device 260 may determine that bypass LSP 250 is capable of supporting network traffic associated with LSP 240 and continue to use bypass LSP 250. In this way, PLR device 260 may conserve processor and/or memory resources by reducing an amount of computation associated with performing other operations of FIGS. 4A and/or 4B.

As shown, PLR device 260 may periodically determine whether bypass LSP 250 includes an amount of available bandwidth to satisfy the bypass LSP bandwidth threshold after using bypass LSP 250. That is, PLR device 260 may iteratively perform operations associated with block 455. As examples, PLR device 260 may perform operations associated with block 455 based on a time frame, a time interval, a time period, or the like. In this way, PLR device 260 may determine whether bypass LSP 250 is capable of accommodating network traffic of LSP 240 without causing communication issues, such as packet loss, high latency, reduced throughput, etc.

As further shown in FIG. 4B, if the bypass LSP does not include an amount of available bandwidth to satisfy the bypass LSP bandwidth threshold (block 460—NO), then process 400 may include returning to block 415 of FIG. 4A. For example, if bypass LSP 250 does not include an amount of available bandwidth that satisfies the bypass LSP bandwidth threshold, then PLR device 260 may iteratively perform operations associated with block 415 through 455. That is, PLR device 260 may return to block 415, and perform associated operations (i.e., iteratively perform operations of FIGS. 4A and/or 4B). In this way, PLR device 260 may select a particular bypass LSP 250 that is capable of accommodating network traffic associated with LSP 240. Additionally, PLR device 260 may select another bypass LSP 250 without reserving bandwidth of the other bypass LSP 250.

As another example, PLR device 260 may iteratively perform operations of FIGS. 4A and/or 4B to select a best path for bypass LSP 250. For example, PLR device 260 may select a path that includes a least number of hops, most available bandwidth, etc.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A point of local repair device, comprising:
   one or more memories, and
   one or more processors, operatively coupled to the one or more memories, to:
      receive information that identifies a bandwidth value of a primary label-switched path (LSP) that includes a protected link or a protected node;
      determine a bypass LSP available bandwidth threshold based on the bandwidth value;
      determine a set of path bandwidth values associated with a set of paths;
      compare the set of path bandwidth values and the bypass LSP available bandwidth threshold;
      select a path, of the set of paths, based on comparing the set of path bandwidth values and the bypass LSP available bandwidth threshold;
         wherein the one or more processors, when selecting the path:
            determine that none of the paths, of the set of paths, has a bandwidth value that satisfies the bypass LSP available bandwidth threshold;
            identify a candidate path, of the set of paths, that has a greatest available bandwidth value among the paths in the set of paths, and
            select the identified candidate path, as the path, based on the identified candidate path having the greatest available bandwidth value; and
      generate a bypass LSP using the path, wherein the bypass LSP is used when a link of the primary LSP fails,
         wherein the bypass LSP is generated without reserving bandwidth of the path.

2. The point of local repair device of claim 1, where the one or more processors are further to:
   determine that multiple candidate paths, of the set of paths, have a same greatest available bandwidth value;
   identify a particular path, of the multiple candidate paths, that includes a least number of hops as compared to other paths of the multiple candidate paths; and
   select the particular path, as the path, based on the particular path including the least number of hops.

3. The point of local repair device of claim 1, where the bandwidth value of the primary LSP includes a reserved bandwidth value.

4. The point of local repair device of claim 1, where the one or more processors are further to:
   determine whether the bypass LSP includes an available bandwidth value that satisfies the bypass LSP available bandwidth threshold after generating the bypass LSP; and
   selectively generate another bypass LSP based on whether the available bandwidth value satisfies the bypass LSP available bandwidth threshold.

5. The point of local repair device of claim 1, where the bypass LSP available bandwidth threshold is determined based at least in part on a reserved bandwidth of the primary LSP.

6. The point of local repair device of claim 1, where the bypass LSP available bandwidth threshold is determined based at least in part on paths within the primary LSP for which link protection is enabled.

7. The point of local repair device of claim 1, where the bypass LSP available bandwidth threshold is determined based at least in part on a total reserved bandwidth value of paths within the primary LSP.

8. A non-transitory computer-readable medium storing instructions, the instructions comprising:
   one or more instructions that, when executed by one or more processors, cause the one or more processors to:
      receive information that identifies a bandwidth value of a primary label-switched path (LSP) that includes a protected link or a protected node;
      determine a bypass LSP available bandwidth threshold based on the bandwidth value;
      determine a set of path bandwidth values associated with a set of paths;
      compare the set of path bandwidth values and the bypass LSP available bandwidth threshold;
      select a path, of the set of paths, based on comparing the set of path bandwidth values and the bypass LSP available bandwidth threshold;
         wherein the one or more instructions that cause the one or more processors to select the path, cause the one or more processors to:
            determine that none of the paths, of the set of paths, has a bandwidth value that satisfies the bypass LSP available bandwidth threshold,
            identify a candidate path, of the set of paths, that has a greatest available bandwidth value, and
            select the identified candidate path, as the path, based on the identified candidate path having the greatest available bandwidth value;
      generate a bypass LSP using the path, wherein the bypass LSP is to be used when a link of the primary LSP fails, wherein the bypass LSP is generated without reserving bandwidth of the path; and provide, based on a link of the primary LSP failing, network traffic using the bypass LSP.

9. The non-transitory computer-readable medium of claim 8, wherein the one or more instructions that cause the one or more processors to select the path, cause the one or more processors to:

determine that multiple candidate paths, of the set of paths, have a same greatest available bandwidth value;

identify a particular path, of the multiple candidate paths, that includes a least number of hops as compared to other candidate paths of the multiple candidate paths; and select the particular path, as the path, based on the particular path including the least number of hops.

10. The non-transitory computer-readable medium of claim 8, where the bandwidth value of the primary LSP is a reserved bandwidth value.

11. The non-transitory computer-readable medium of claim 8, where the one or more instructions, when executed by the one or more processors, further cause the one or more processors to:

generate the bypass LSP without reserving bandwidth of the path.

12. The non-transitory computer-readable medium of claim 8, where the bypass LSP available bandwidth threshold is determined based at least in part on a reserved bandwidth of the primary LSP.

13. The non-transitory computer-readable medium of claim 8, where the bypass LSP available bandwidth threshold is determined based at least in part on paths within the primary LSP for which link protection is enabled.

14. The non-transitory computer-readable medium of claim 8, where the bypass LSP available bandwidth threshold is determined based at least in part on a total reserved bandwidth value of paths within the primary LSP.

15. A method, comprising:

receiving, by a device, information that identifies a bandwidth value of a primary label-switched path (LSP) that includes a protected link or a protected node;

determining, by the device, a bypass LSP available bandwidth threshold based on the bandwidth value;

determining, by the device, a set of path bandwidth values associated with a set of paths;

comparing, by the device, the set of path bandwidth values and the bypass LSP available bandwidth threshold;

selecting, by the device, a path, of the set of paths, based on comparing the set of path bandwidth values and the bypass LSP available bandwidth threshold;

wherein selecting the path comprises:

determining, by the device, that none of the paths, of the set of paths, has a bandwidth value that satisfies the bypass LSP available bandwidth threshold, identifying, by the device, a candidate path, of the set of paths, that includes a greatest available bandwidth value, and selecting, by the device, the identified candidate path, as the path, based on the identified candidate path including the greatest available bandwidth value; and generating, by the device, a bypass LSP using the path and without reserving bandwidth of the path, wherein the bypass LSP is used when a link of the primary LSP fails.

16. The method of claim 15, wherein selecting the path further comprises:

determining, by the device, that multiple candidate paths, of the set of paths, have a same greatest available bandwidth value;

identifying, by the device, a particular path, of the multiple candidate paths, that includes a least number of hops as compared to other paths of the multiple candidate paths; and selecting, by the device, the particular path, as the path, based on the particular path including the least number of hops.

17. The method of claim 15, further comprising:

selecting another path; and providing network traffic, of the primary LSP, using the path and the other path.

18. The method of claim 15, where the bandwidth value of the primary LSP includes a reserved bandwidth value.

19. The method of claim 15, further comprising:

determining whether the bypass LSP includes an amount of available bandwidth that satisfies the bypass LSP available bandwidth threshold after generating the bypass LSP.

20. The method of claim 15, where the bypass LSP available bandwidth threshold is determined based at least in part on a reserved bandwidth of the primary LSP.

* * * * *